(12) United States Patent
Liang et al.

(10) Patent No.: US 12,426,104 B2
(45) Date of Patent: *Sep. 23, 2025

(54) OPERATION METHOD OF SLAVE DEVICE IN BLUETOOTH SYSTEM

(71) Applicant: PixArt Imaging Inc., Hsin-Chu County (TW)

(72) Inventors: Jr-Kai Liang, Hsin-Chu County (TW); Min-Hsiang Hsia, Hsin-Chu County (TW)

(*) Notice: Subject to any disclaimer, the term of this patent is extended or adjusted under 35 U.S.C. 154(b) by 406 days.

This patent is subject to a terminal disclaimer.

(21) Appl. No.: 18/097,206

(22) Filed: Jan. 14, 2023

(65) Prior Publication Data

US 2023/0171820 A1    Jun. 1, 2023

Related U.S. Application Data

(63) Continuation of application No. 16/818,214, filed on Mar. 13, 2020, now Pat. No. 11,596,006.

(51) Int. Cl.
*H04W 76/10* (2018.01)
*H04W 4/80* (2018.01)
H04W 56/00 (2009.01)
H04W 76/30 (2018.01)

(52) U.S. Cl.
CPC ............. *H04W 76/10* (2018.02); *H04W 4/80* (2018.02); *H04W 56/001* (2013.01); *H04W 76/30* (2018.02)

(58) Field of Classification Search
CPC ....... H04W 4/80; H04W 76/10; H04W 76/30; H04W 56/001; H04W 56/00
See application file for complete search history.

(56) References Cited

U.S. PATENT DOCUMENTS

| | | | | |
|---|---|---|---|---|
| 9,414,217 B2* | 8/2016 | Knaappila | ............. | H04W 76/14 |
| 11,596,006 B2* | 2/2023 | Liang | ..................... | H04W 4/80 |
| 2015/0109480 A1* | 4/2015 | Wang | .................. | H04N 23/662 |
| | | | | 348/239 |
| 2019/0394818 A1* | 12/2019 | Hwang | ................. | H04W 8/005 |

* cited by examiner

*Primary Examiner* — Tuan H Nguyen
(74) *Attorney, Agent, or Firm* — Bruce Stone LLP; Joseph A. Bruce

(57) ABSTRACT

There is provided a Bluetooth system including multiple slave devices. When a first slave device among the multiple slave devices changes its connection to a different master device, the first slave device actively informs other slave devices among the multiple slave devices to connect to said different master device to realize the Bluetooth connection synchronization between the multiple slave devices.

19 Claims, 7 Drawing Sheets

OPERATION METHOD OF SLAVE DEVICE IN BLUETOOTH SYSTEM

CROSS REFERENCE TO RELATED APPLICATION

This application is a continuation application of U.S. application Ser. No. 16/818,214, filed on Mar. 13, 2020, the full disclosure of which is incorporated herein by reference.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to a Bluetooth system and, more particularly, to a Bluetooth system and a connection synchronizing method thereof that include a first slave device and a second slave device for being Bluetooth-connected to multiple master devices, wherein when the first slave device changes a connected master device among the multiple master devices, the first slave device actively informs the second slave device to connect to the same master device.

2. Description of the Related Art

Referring to FIG. 1, it is a schematic block diagram of a conventional Bluetooth system including a first host 91, a second host 92, a keyboard 93 and a mouse device 94. Assuming that the keyboard 93 and the mouse device 94 have been Bluetooth connected to the first host 91, when one of the keyboard 93 and the mouse device 94 is controlled by a user to change to Bluetooth connect to the second host 92, the second host 92 needs to inform the other one of the keyboard 93 and the mouse device 94 to connect to the second host 92 to realize the connection synchronization such that it is required to use the control of application software and driving procedure of the second host 92.

More specifically, conventionally the Bluetooth connection of the slave side is synchronized by the host side through informing the slave side.

Accordingly, the present disclosure further provides a Bluetooth system and a connection synchronizing method thereof that self-synchronize the Bluetooth connection by the slave side so as to avoid the control of application software and driving procedure of the host side.

SUMMARY

The present disclosure provides a Bluetooth system and a connection synchronizing method thereof in which the slave devices inform with each other regarding the changing of the currently connected master device to achieve the objective of connection synchronization.

The present disclosure provides an operation method of a first slave device of a Bluetooth system. The first slave device is Bluetooth paired to multiple master devices. The operation method includes the steps of: advertising a packet containing a device address of the first slave device when a master device connected with the first slave device is changed to a new master device, which is currently connected with the first slave device; identifying whether a scan request from a second slave device is received after the packet is advertised by the first slave device; and replying with a scan response to the second slave device when the first slave device receives the scan request to inform the second slave device to connect to the new master device currently connected with the first slave device.

The present disclosure further provides an operation method of a Bluetooth slave device including the steps of: scanning and identifying, by the Bluetooth slave device, whether an advertising, sent when a master device connected with a first slave device is changed to a new master device which is currently connected with the first slave device, is received from the first slave device; replying with a scan request to the first slave device when the Bluetooth slave device receives the advertising from the first slave device; identifying, by the Bluetooth slave device, whether a scan response from the first slave device is received; and connecting the Bluetooth slave device to the new master device currently connected with the first slave device after the Bluetooth slave device receives the scan response from the first slave device.

The present disclosure further provides an operation method of a first slave device of a Bluetooth system. The first slave device is Bluetooth paired to a first master device and a second master device. The operation method includes the steps of: disconnecting the first slave device from the first master device already Bluetooth connected with the first slave device; searching for connection information of the second master device stored therein; advertising a packet containing a device address of the first slave device after the connection information of the second master device is found in the first slave device; identifying whether a scan request from a second slave device is received; replying with a scan response to the second slave device when the first slave device receives the scan request from the second slave device; and Bluetooth connecting the first slave device to the second master device.

In the embodiment of the present disclosure, the connection is referred to the Bluetooth connection. Accordingly, the master device and the slave device mentioned in the present disclosure both include at least a Bluetooth chip or module for executing the Bluetooth transmission and pairing, as well as a Bluetooth transceiver for sending and receiving wireless signals.

In the embodiment of the present disclosure, one of the first slave device and the second slave device is a primary slave and the other one is a secondary slave, but the roles are exchangeable. The primary slave is used to lead the connection change with master devices.

In the embodiment of the present disclosure, the master device and the slave device use the standard Bluetooth protocol to perform the connection and data transmission therebetween. Every slave device sends and receives data and signals associated with the synchronization using a time interval, behind the time interval within Bluetooth time slots, for sending and receiving data between the master device and the slave device.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The present disclosure is adapted to the connection synchronizing method between different slave devices and multiple master devices to cause the different slave devices to Bluetooth connect to the same master device among the multiple master devices through the communication between the different slave devices instead of informing the different slave devices by any of the master devices.

Figure 1:
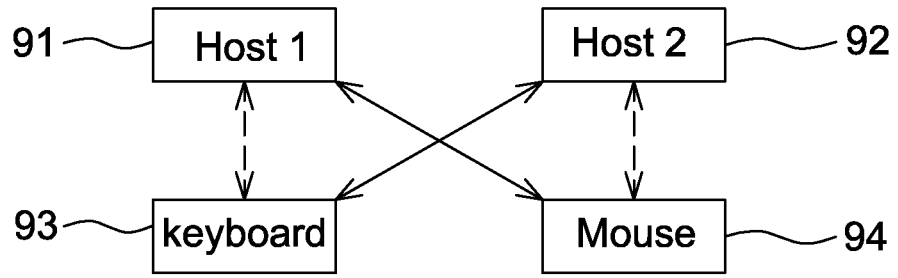
FIG. 1 is a schematic block diagram of a conventional Bluetooth system.
Figure 2:
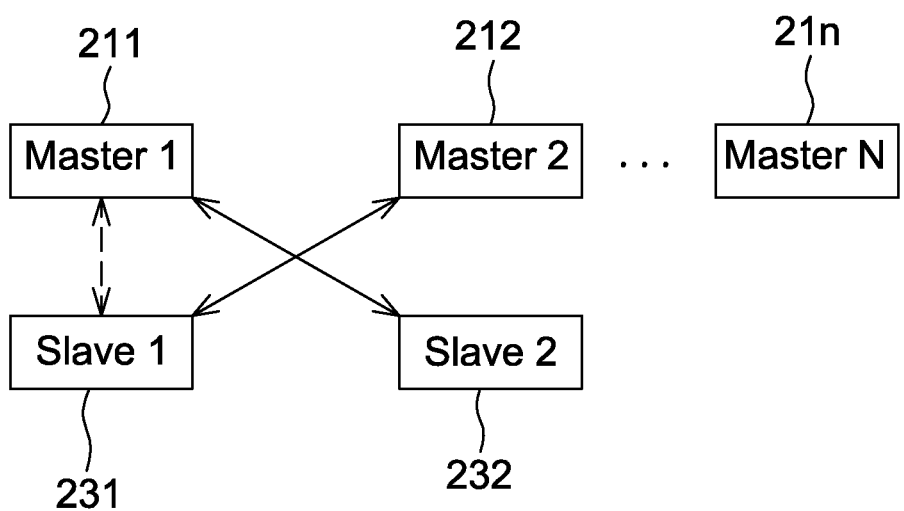
FIG. 2 is a schematic block diagram of a Bluetooth system according to one embodiment of the present disclosure.

Referring to FIG. 2, it is a schematic block diagram of a Bluetooth system 200 according to one embodiment of the present disclosure. The Bluetooth system 200 includes a first slave device 231 and a second slave device 232 for being Bluetooth-connected to multiple master devices (e.g., shown as 211, 212 . . . 21n that have identical or different types from one another), wherein the master devices 211, 212 . . . 21n are selected from, for example, a computer system (e.g., a notebook computer, a desktop computer, a tablet computer or the like), a mobile phone or other electronic devices capable of using as a master of the Bluetooth communication. The first slave device 231 and the second slave device 232 are selected from, for example, a computer peripheral (e.g., a mouse device, keyboard, a joystick, a webcam or the like), a Bluetooth earphone set, a Bluetooth microphone or other electronic devices capable of using as a slave of the Bluetooth communication. The first slave device 231 and the second slave device 232 have identical or different types.

In the present disclosure, the master devices 211, 212 . . . 21n, the first slave device 231 and the second slave device 232 all include at least a Bluetooth chip (or module) for performing the Bluetooth transmission and pairing, as well as a Bluetooth transceiver for sending and receiving wireless signals. Furthermore, the first slave device 231 and the second slave device 232 are embedded with the auxiliary synchronizing program encoded in software for the connection synchronization between slave devices mentioned below.

Besides, every slave device of the present disclosure further includes a memory (not shown) for storing and recording device names, device passwords, device addresses and bonding information associated with the multiple master devices 211, 212 . . . 21n, i.e. each slave device being previously Bluetooth paired with the multiple master devices 211, 212 . . . 21n, wherein said "Bluetooth paired" is accomplished using standard Bluetooth protocol. In addition, the memory further records the connecting priority, e.g., recorded as pairing index, of the multiple master devices 211, 212 . . . 21n. For example, when the first master device 211 (e.g., ranking 1) is not connectable or a slave device is controlled to change the connection with the first master device 211, the slave device searches and connects with the second master device 212; when the second master device 212 (e.g., ranking 2) is not connectable or a slave device is controlled to change the connection with the second master device 212, the slave device searches and connects with a master device having a next priority; and so on. Furthermore, the memory further records a connection state of a slave device with a master device, e.g., using a register to record a content such as "1" or "0", but not limited to, to indicate the connection state.

The memory is, for example, a EEPROM, a RAM or a Flash memory.

In the present disclosure, when the first slave device 231 and the second slave device 232 are connected with different master devices, predetermined one of the first slave device 231 and the second slave device 232 informs the other one to change the connected master device thereof to achieve the objective of connection synchronization. Some embodiments are given below as examples.

Figure 3:
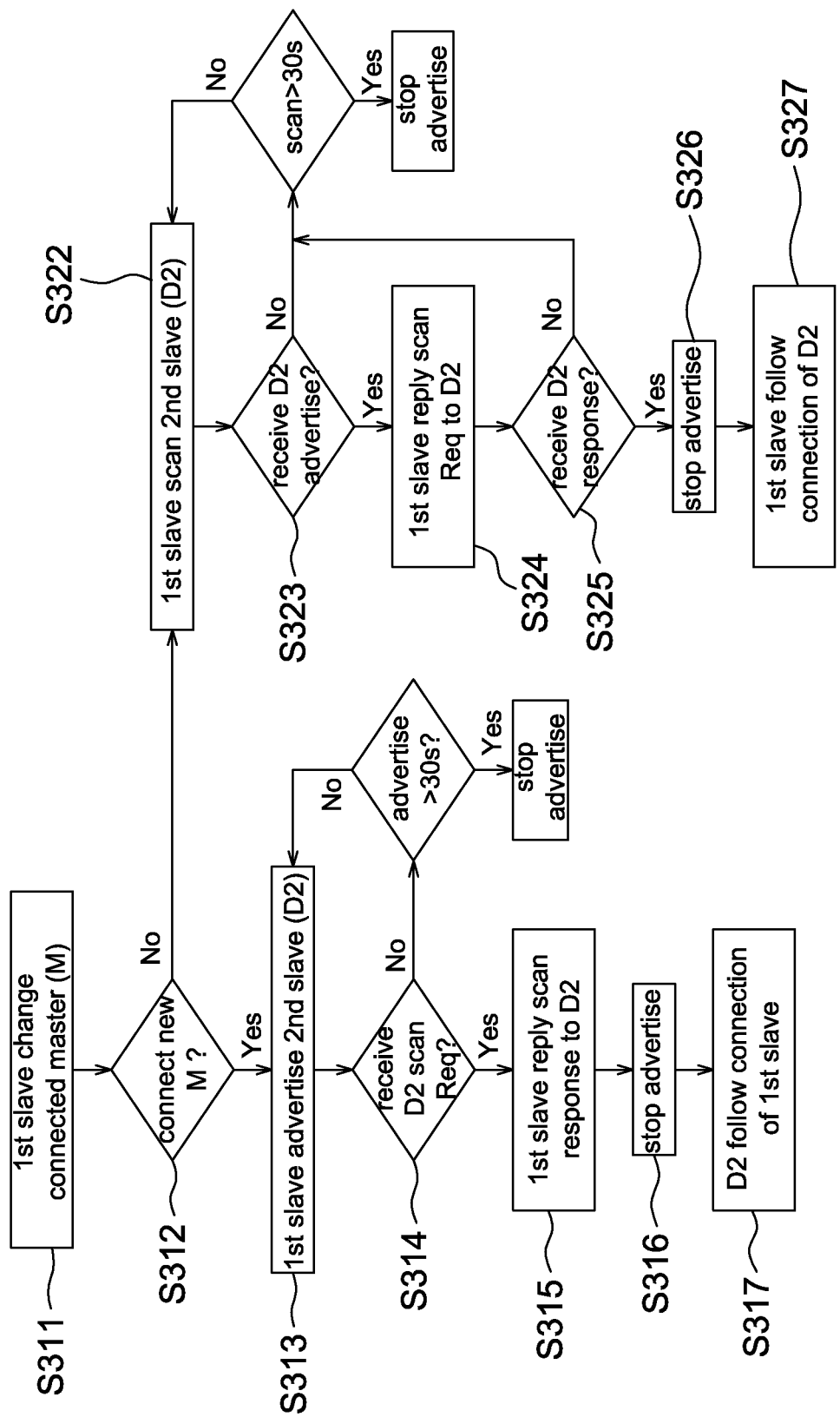
FIG. 3 is a flow chart of a connection synchronizing method of a Bluetooth system according to one embodiment of the present disclosure.

Referring to FIG. 3, it is a flow chart of a connection synchronizing method of a Bluetooth system 200 according to one embodiment of the present disclosure. In this embodiment, it is assumed that (1) there is only one master device within the connection range of the first slave device 231 and the second slave device 232; (2) the connecting priority of the first slave device 231 is higher than that of the second slave device 232; and (3) the first slave device 231 performs the advertising prior to scanning, and the second slave device 232 performs the scanning priority to advertising. As mentioned above, the first slave device 231 (sometimes abbreviated as D1 herein) and the second slave device 232 (sometimes abbreviated as D2 herein) are recorded with connection information of multiple Bluetooth paired master devices, e.g., including the connecting priority, device name, device password, device address and other associated Bluetooth connection information of the multiple master devices 211, 212 . . . 21n. It is appreciated that new connection information can be added to the memory if there is a new master device is detected. The Bluetooth pairing is known to the art and not a main objective of the present disclosure, and thus details thereof are not described herein.

Referring to FIGS. 2 and 3, details of this embodiment are described below. As in FIG. 2, the Bluetooth system 200 includes a first slave device 231 and a second slave device 232 coupled to multiple master devices 211, 212 . . . 21n.

Steps S311-S312: When the first slave device 231 is powered on, is waked up, or receives a switching signal, the first slave device 231 identifies whether a master device connected thereto is changed. For example, it is assumed that the previous connection of the first slave device 231 is with the first master device 211, and information regarding this connection is recorded in memory thereof.

In this embodiment, the switching signal is generated according to the control of a user on the first slave device 231, e.g., pressing a key, rotating a knob, touching a touch panel for predetermined times or knocking the device for predetermined times. In addition, the switching signal is also a response received by the first slave device 231 from another master device (e.g., the second master device 212) without from the first master device 211 (e.g., the first master device 211 not within the connection range), e.g., said switching signal being a response packet (e.g., CONNECT_REQ) from another master device, but not limited to.

Step S313: When the first slave device 231 changes a master device connected thereto (e.g., switching to the second master device 212), the first slave device 231 sends the advertising to the second slave device 232, wherein the packet of the advertising contains at least the device address of the first slave device 231.

Figure 6:
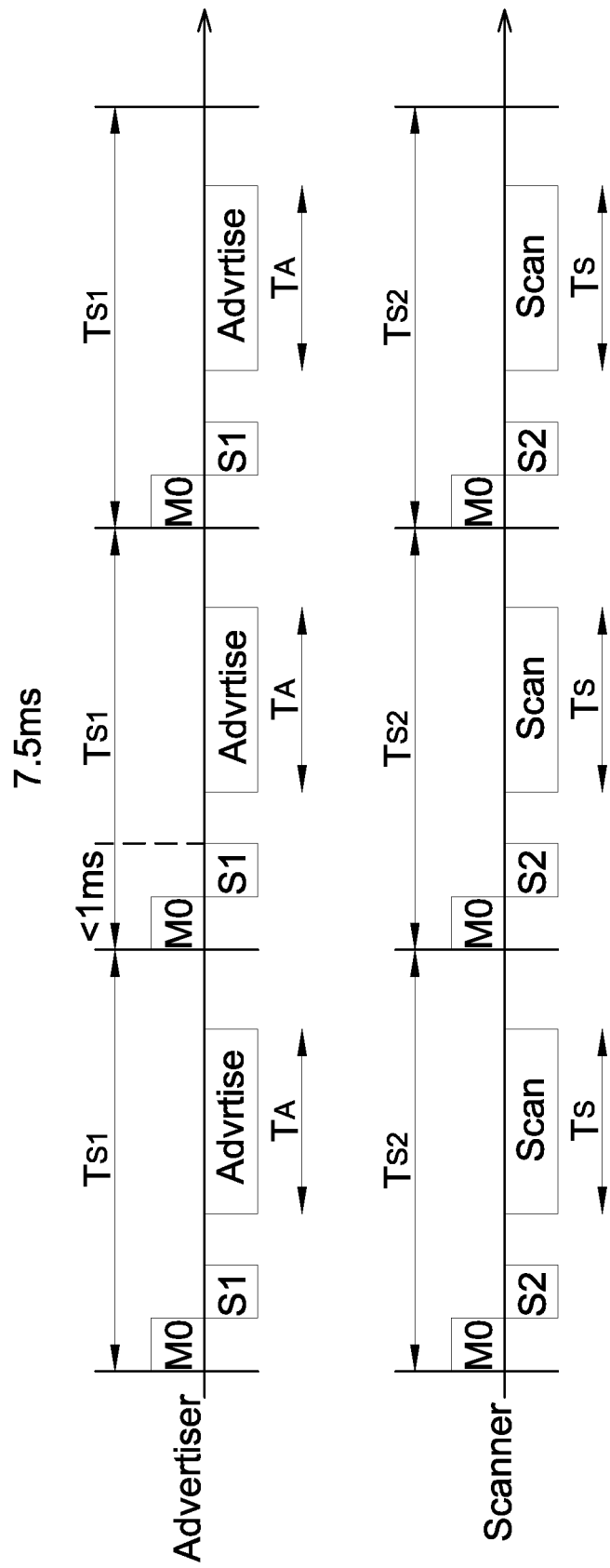
FIG. 6 is a timing diagram of the communication of a Bluetooth system according to one embodiment of the present disclosure.

Referring to FIG. 6, when the first slave device 231 accomplishes the Bluetooth connection with one master device, the first slave device 231 and the one master device transmits data using the Bluetooth time slot $T_{S1}$ (e.g., 7.5 ms for example), e.g., the one master device transmitting data to the first slave device 231 within time intervals M0, the first slave device 231 transmitting data to the one master device within time intervals S1. In this embodiment, the first slave device 231 connects and communicates with the one master device using standard Bluetooth protocol.

The standard Bluetooth protocol includes, for example, the steps of: the first slave device 231 advertising ADV_DIRECT_IND packet at a predetermined cycle to the one master device; the one master device responding CONNECT_REQ request, which carries parameters used in the following communication such as time points and physical channels for transmitting and receiving data, to the first slave device 231, and then the one master device automatically entering the connection state and becoming a master; the first slave device 231 also entering the connection state and becoming a slave after receiving the CONNECT_REQ request; and then the two sides switching to the predetermined physical channel at predetermined time points according to the parameters indicated in CONNECT_REQ to exchange data in a sequence of master→slave and then slave→master till the connection is ended.

Step S314: The first slave device 231 identifies whether a scan request from the second slave device 232 is received or not, wherein the packet of the scan request contains at least the device address of the second slave device 232. When the first slave device 231 does not receive the scan request from the second slave device 232, the first slave device 231 continuously performs the advertising to the second slave device 232 for a predetermined advertising interval, e.g., FIG. 3 showing that the predetermined advertising interval is 30 seconds, but not limited to. That is, the first slave device 231 sends an advertising packet in every Bluetooth time slot $T_{S1}$ within the predetermined advertising interval. When the first slave device 231 performs the advertising to reach the predetermined advertising interval, the advertising is stopped, meaning the second slave device 232 not within the connection range or being turning off.

As shown in FIG. 6, right now the first slave device 231 is an advertiser that performs the advertising within time intervals $T_A$, and the second slave device 232 is a scanner that performs the scanning within time intervals $T_S$. In the present disclosure, $T_{S1}$ is identical to or different from $T_{S2}$.

Step S315: When receiving the scan request from the second slave device 232, the first slave device 231 replies a scan response to the second slave device 232, wherein the scan response is preferably replied within the time interval $T_A$ in FIG. 6. In this embodiment, the scan response replied from the first slave device 231 contains pairing information of the master device (e.g., the device name, device address, device password of the second master device 212), a pairing index (e.g., ranking of the pairing of the second master device 212 when the first slave device 231 and the second slave device 232 previously record multiple paired information), predetermined arrangement parameters required in synchronizing slave devices (e.g., encryption key for connection and other user-defined information) and a connection state of the first slave device 231 (whether the connection is constructed, e.g., indicated by at least one bit). That is, the scan response contains information that causes the second slave device 232 to know which master device is currently connected with the first slave device 231.

Step S316: After the first slave device 231 replies the scan response to the second slave device 232, the advertising of the first slave device 231 is stopped.

Step S317: Finally, the second slave device 232 connects to the master device that the first slave device 231 is currently connected to, e.g., the second master device 212, according to data of the scan response. Accordingly, the slave devices accomplish the connection synchronization only using the synchronizing procedure between slave devices (e.g., the advertising, scan request and scan response mentioned above) without using the application software or driving procedure of any master device. As mentioned above, the first slave device 231 and the second slave device 232 are embedded with the auxiliary synchronizing program encoded in software for executing the connection synchronizing procedure such as the above advertising, scan request and scan response.

In Step S312, when the first slave device 231 does not connect with any master device, the first slave device 231 scans the second slave device 232 within time intervals $T_S$, Step S322.

Step S323: The first slave device 231 identifies whether an advertising from the second slave device 323 is received or not, wherein the packet of the advertising contains at least the device address of the second slave device 232. Right now, the second slave device 232 is the advertiser in FIG. 6 for advertising within time intervals $T_A$, and the first slave device 213 is the scanner in FIG. 6 for scanning within time intervals $T_S$.

When not receiving the advertising from the second slave device 232, the first slave device 231 continuously scans the second slave device 232 for a predetermined scanning interval, e.g., FIG. 3 showing that the scanning interval is 30 seconds, but not limited to. That is, the first slave device 231 performing the scanning in every Bluetooth time slot $T_{S2}$ within the predetermined scanning interval. When the scanning of the first slave device 231 reaches the predetermined scanning interval, the scanning is stopped, meaning the second slave device 232 not within the connection range or being turned off.

Figure 7A:
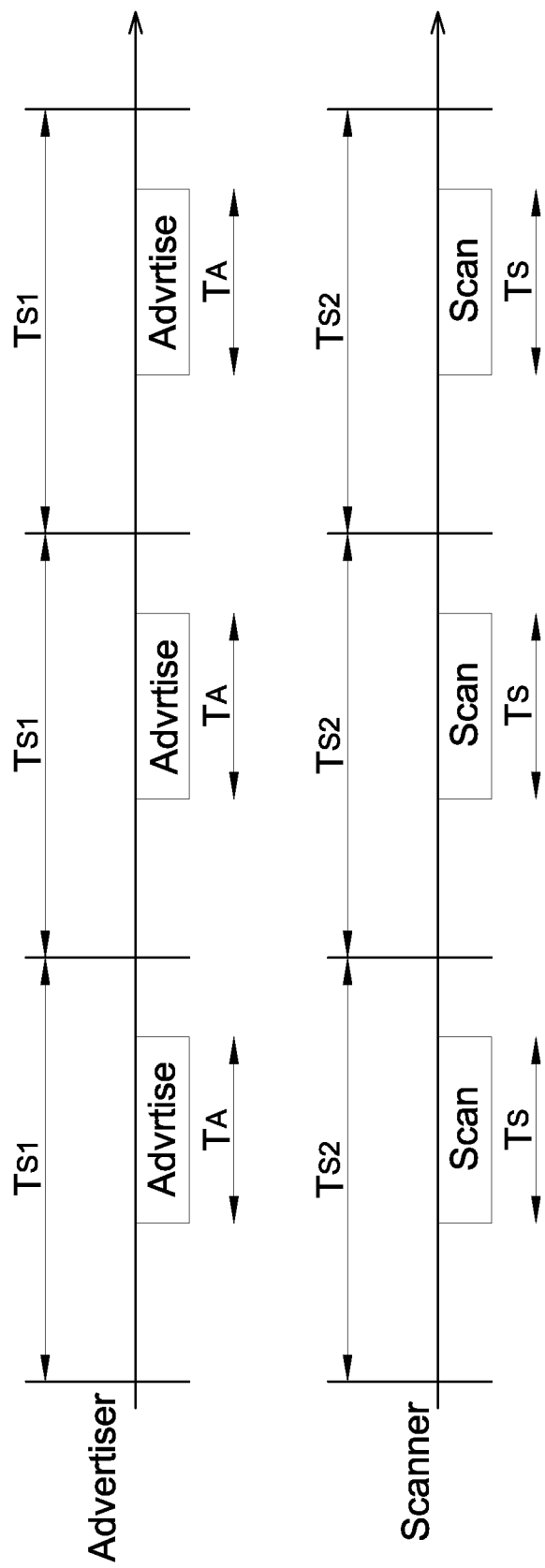
FIGS. 7A and 7B are timing diagrams of the communication of a Bluetooth system according to some embodiments of the present disclosure.
Figure 7B:
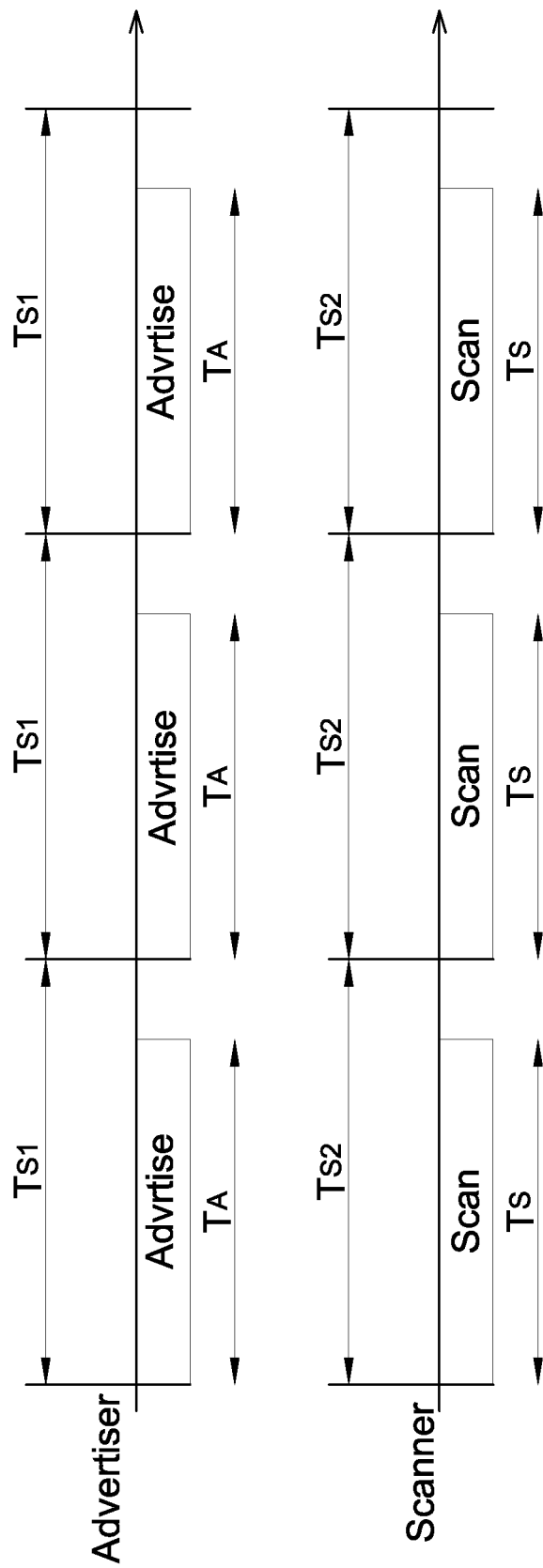

Referring to FIGS. 7A and 7B, when the first slave device 231 does not connect to any master device, a scanning interval (i.e. $T_S$) that the first slave device 231 scans the second slave device 232 starts from a start point (e.g., FIG. 7B) or after 1 ms from the start point (e.g., FIG. 7A) of Bluetooth time slots $T_{S2}$, wherein the 1 ms is a predetermined time interval (e.g., M0+S1 or M0+S2 in FIG. 6) for data exchanging between the master device and the slave device defined in standard Bluetooth protocol, wherein the predetermined time interval is properly selected according to different applications and not limited to 1 ms.

Step S324: When receiving the advertising from the second slave device 232, the first slave device 231 replies a scan request to the second slave device 232, wherein the packet of the scan request contains at least the device address of the first slave device 231.

Step S325: Next, the first slave device 231 identifies whether a scan response from the second slave device 232 is received or not, wherein the scan response is preferably replied within the time intervals $T_A$ in figures. In this embodiment, the scan response replied from the second slave device 232 contains pairing information of the master device (e.g., the device name, device address, device password of the second master device 212), a pairing index (e.g., ranking of the pairing of the second master device 212 when the first slave device 231 and the second slave device 232 previously records multiple paired information), predetermined arrangement parameters required in synchronizing slave devices (e.g., encryption key for connection and other user-defined information) and a connection state of the second slave device 232 (whether the connection is constructed, e.g., indicated by at least one bit). That is, the scan response contains information that causes the first slave device 231 to know which master device is currently connected with the second master device 212.

Step S326: After receiving the scan response from the second slave device 232, the first slave device 231 stops the scanning, and then connects to the master device (e.g., 212) that the second slave device 232 is currently connected, Step S327. The first slave device 231 and the master device performs the connection and communication according to standard Bluetooth protocol, and thus details thereof are not described herein.

In this way, the slave devices accomplish the connection synchronization only using the synchronizing procedure between slave devices (e.g., advertising, scan request and scan response mentioned above) without using the application software and driving procedure of any master device.

Figure 4:
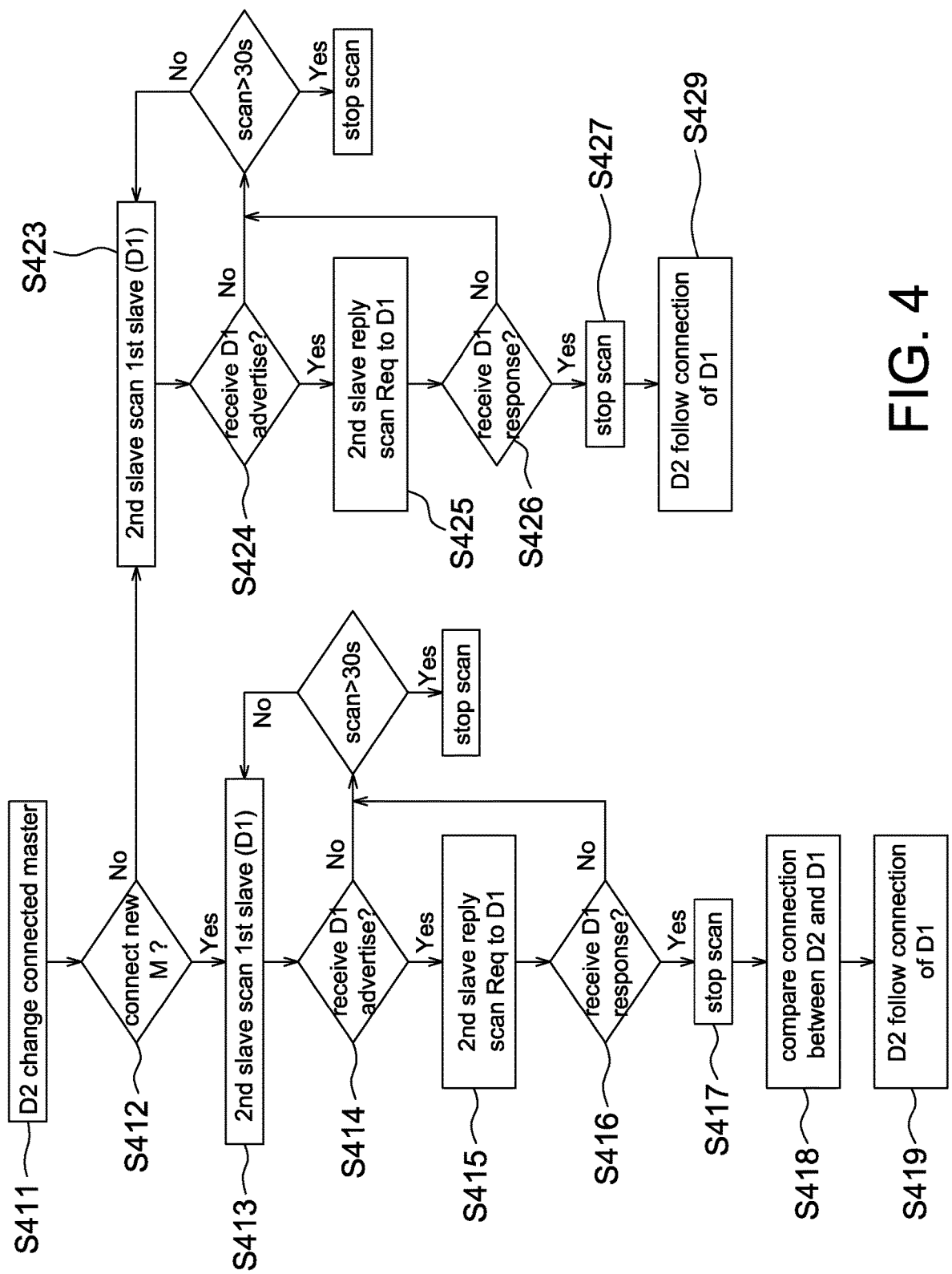
FIG. 4 is a flow chart of a connection synchronizing method of a Bluetooth system according to another embodiment of the present disclosure.

Referring to FIG. 4, it is a flow chart of a connection synchronizing method of a Bluetooth system 200 according to another embodiment of the present disclosure. In this embodiment, it is assumed that (1) there is only one master device within the connection range of the first slave device 231 and the second slave device 232; (2) the connecting priority of the first slave device 231 is higher than that of the second slave device 232; and (3) the first slave device 231 performs only the advertising, and the second slave device 232 performs only the scanning. Similarly, the first slave device 231 and the second slave device 232 are recorded with connection information of multiple Bluetooth paired master devices, e.g., including the connecting priority, device name, device password, device address and other associated Bluetooth connection information of the multiple master devices 211, 212 . . . 21n.

Referring to FIGS. 2 and 4 together, details of this embodiment are described below.

Steps S411-S412: When the second slave device 232 is powered on, waked up, or receives a switching signal, the second slave device 232 identifies whether a new master device is connected. For example, it is assumed that the previous connection of the second slave device 232 is with the first master device 211, and information regarding this connection is recorded in the memory thereof. In this embodiment, the switching signal is generated according to the control of a user on the second slave device 232, e.g., pressing a key, rotating a knob, touching a touch panel for predetermined times or knocking the device for predetermined times. In addition, the switching signal is also a response received by the second slave device 232 from another master device (e.g., the second master device 212) without from the first master device 211 (e.g., the first master device 211 not within the connection range), e.g., said switching signal is a response packet (e.g., CONNECT_REQ) from another master device, but not limited to.

Step S413: When the second slave device 232 changes a master device connected thereto (e.g., the second master device 212), the second slave device 232 scans the first slave device 231 within the time interval $T_S$ in FIG. 6, e.g., Step S413.

As shown in FIG. 6, when the second slave device 232 accomplishes the Bluetooth connection with one master device, the second slave device 232 and the one master device transmits data using the Bluetooth time slot $T_{S2}$ (e.g., 7.5 ms for example), e.g., the one master device transmitting data to the second slave device 232 within time intervals M0, the second slave device 232 transmitting data to the one master device within time intervals S2. In this embodiment, the second slave device 232 and the master device performs the connection and communication using standard Bluetooth protocol, and thus details thereof are not described herein.

Step S414: The second slave device 232 identifies whether an advertising from the first slave device 231 is received or not, wherein the packet of the advertising contains at least the device address of the first slave device 231. Right now, the first slave device 231 is the advertiser in FIG. 6 for advertising within time intervals $T_A$, and the second slave device 232 is the scanner in FIG. 6 for scanning within time intervals $T_S$.

When not receiving the advertising from the first slave device 231, the second slave device 232 continuously scans the first slave device 231 for a predetermined scanning interval, e.g., FIG. 4 showing the predetermined scanning interval as 30 seconds, but not limited to. That is, the second slave device 232 performing the scanning in every Bluetooth time slot $T_{S2}$ within the predetermined scanning interval. When the scanning of the second slave device 232 reaches the predetermined scanning interval, the scanning is stopped, meaning the first slave device 231 not within the connection range or being turned off.

Step S415: When receiving the advertising from the first slave device 231, the second slave device 232 replies a scan request to the first slave device 231, wherein the packet of the scan request contains at least the device address of the second slave device 232.

Step S416: Next, the second slave device 232 identifies whether a scan response from the first slave device 231 is received or not, wherein the scan response is preferably replied within the time interval $T_A$ in FIG. 6. In this embodiment, the scan response replied from the first slave device 231 contains pairing information of the master device (e.g., the device name, device address, device password of the second master device 212), a pairing index (e.g., ranking of the pairing of the second master device 212 when the first slave device 231 and the second slave device 232 previously records multiple paired information), predetermined arrangement parameters required in synchronizing slave devices (e.g., encryption key for connection and other user-defined information) and a connection state of the first slave device 231 (whether the connection has been constructed, e.g., indicated by at least one bit).

Step S417: After receiving the scan response from the first slave device 231, the second slave device 232 stops the scanning.

Step S418: After receiving the scan response from the first slave device 231, the second slave device 232 further compares whether the master devices currently connected with the second slave device 232 and the first slave device 231 are identical or not, wherein the second slave device 232 includes, for example, a microcontroller unit (MCU) for performing this comparing procedure.

Step S419: If the second slave device 232 and the first slave device 231 are connected to the same master device, the connection of the second slave device 232 needs no change. Otherwise, the second slave device 232 connects to the master device that the first slave device 231 is currently connected according to the data of the scan response. Accordingly, the slave devices accomplish the connection synchronization only using the synchronizing procedure between slave devices (e.g., the above advertising, scan request and scan response) without using the application software or driving procedure of any master device.

In the Step S412, when the second slave device 232 does not connect to any master device, the Step S423 is entered. In this embodiment, the Steps S423-S429 are substantially identical to the Steps S413-S419 only with the difference that when the second slave device 232 does not connect to any master device, the second slave device 232 does not need to compare the connections between the second slave device 232 and the first slave device 231 (e.g., without a step corresponding to the Step S418). The second slave device 232 directly follows the connection of the first slave device 231.

Referring to FIGS. 7A and 7B again, similarly when the second slave device 232 does not connect to any master device, a scanning interval (i.e. $T_S$) that the second slave device 232 scans the first slave device 231 starts from a start point (e.g., FIG. 7B) or after a predetermined time interval, e.g., 1 ms, from the start point (e.g., FIG. 7A) of Bluetooth time slots $T_{S2}$.

Figure 5:
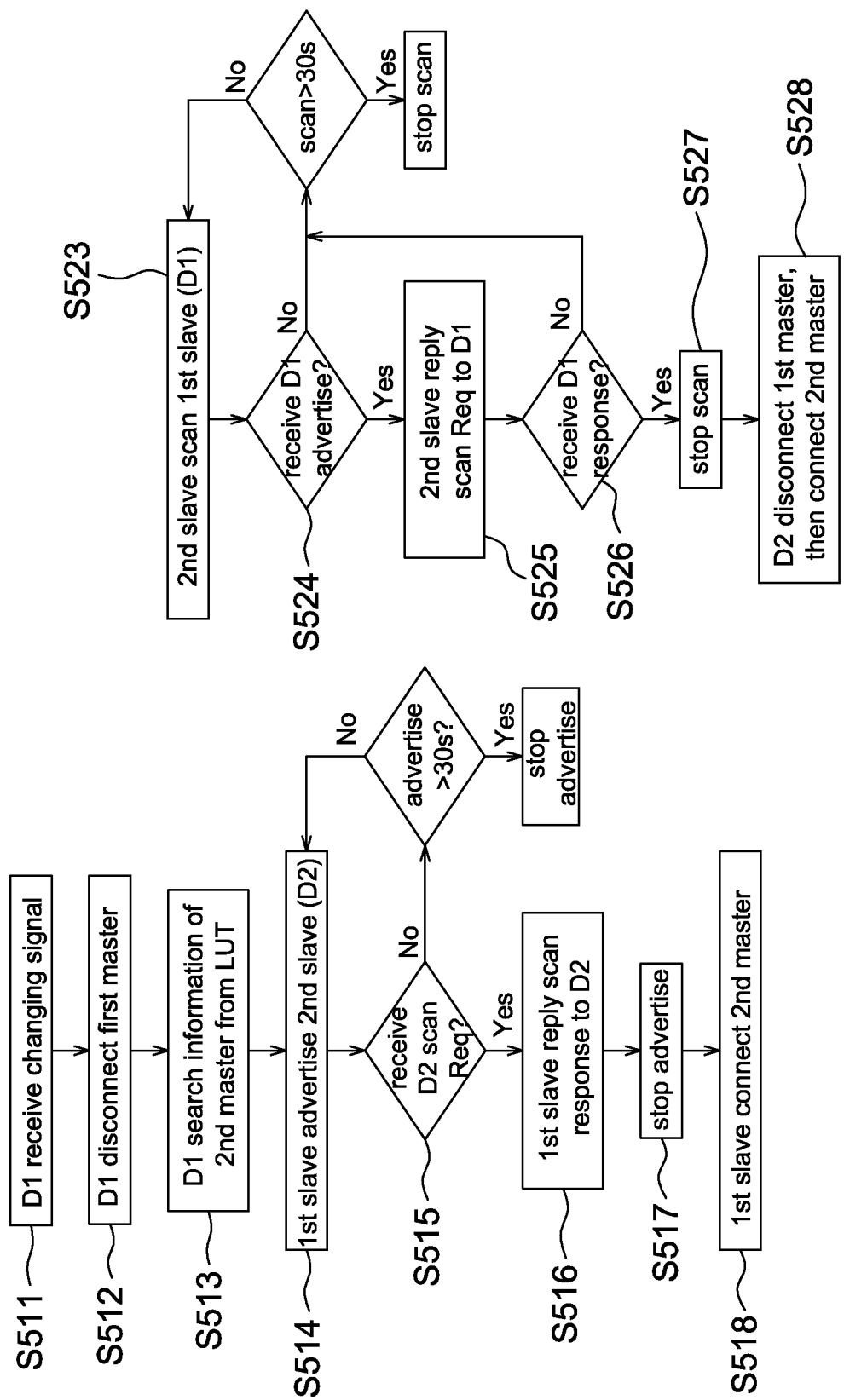
FIG. 5 is a flow chart of a connection synchronizing method of a Bluetooth system according to an alternative embodiment of the present disclosure.

Referring to FIG. 5, it is a flow chart of a connection synchronizing method of a Bluetooth system 200 according to an alternative embodiment of the present disclosure. In this embodiment, it is assumed that (1) there are more than one master device within the connection range of the first slave device 231 and the second slave device 232; (2) the first slave device 231 and the second slave device 232 are already connected with the first master device 211, wherein the connection of the first slave device 231 and the second slave device 232 to the first master device 211 uses standard Bluetooth protocol, and thus details thereof are not described herein. Similarly, the first slave device 231 and the second slave device 232 are recorded with connection information of multiple Bluetooth paired master devices, e.g., including the connecting priority (e.g., pairing index), device name, device password, device address and other associated Bluetooth connection information of the multiple master devices 211, 212 . . . 21n.

Referring to FIGS. 2 and 5, details of this embodiment are described below. As shown in FIG. 2, the Bluetooth system 200 includes a first slave device 231 and a second slave device 232 coupled to a first master device 211 and a second master device 212.

Steps S511-S512: When receiving a switching signal, the first slave device 231 breaks the Bluetooth connection with the first master device 211. As mentioned above, said switching signal is generated by the control of a user on the first slave device 231, or generated when the first slave device 231 receives a response from another master device without from the first master device 211.

Step S513: Next, the first slave device 231 searches connection information of the second master device 212 stored in the memory (e.g., recorded as a lookup table) thereof, e.g., the first slave device 231 having an MCU to perform the searching process. Herein, it is assumed that the connecting priority of the second master device 212 is next to that of the first master device 211. Accordingly, when the first master device 211 is not connectable, the MCU of the first slave device 231 automatically searches the connection information of the second master device 212 stored therein.

Next, the process enters the Steps S514 to S517. In this embodiment, operations of the Steps S514 to S517 are identical to those of the Steps S313 to S316 in FIG. 3, including: advertising, using the first slave device 231, the second slave device 232 (Step S514); identifying, using the first slave device 231, whether a scan request from the second slave device 232 is received (Step S515); replying, using the first slave device 231, a scan response to the second slave device 232 when the first slave device 231 receives the scan request from the second slave device 232 (Step S516); and stopping the advertising of the first slave device 231 after the first slave device 231 replies the scan response to the second slave device 232. Details of the Steps S514 to S517 can be referred to FIG. 3 and the corresponding descriptions and thus are not repeated herein.

Similarly, when the first slave device 231 does not receive the scan request from the second slave device 232, the first slave device 231 continuously performs the advertising to the second slave device 232 for a predetermined advertising interval, e.g., FIG. 5 showing that the predetermined advertising interval is 30 seconds, but not limited to. When the advertising of the first slave device 231 reaches the predetermined advertising interval, the advertising is stopped, meaning the second slave device 232 not within the connection range or being turned off.

Step S518: The first slave device 231 connects to the second master device 212 using standard Bluetooth protocol, which has been described above and known to the art, and thus details thereof are not described herein.

The operation of the first slave device 231 in FIG. 5 has been described above, and the operation of the second slave device 232 is referred to Steps S523 to S528, wherein operations of the Steps S523 to S528 are identical to those of the Steps S413 to S417 in FIG. 4 including: scanning, using the second slave device 232, the first slave device 231 (Step S523); identifying, using the second slave device 232, whether the advertising from the first slave device 231 is received (Step S524); replying, using the second slave device 232, the scan request to the first slave device 231 when the second slave device 232 receives the advertising from the first slave device 231 (Step S525); identifying, using the second slave device 232, whether the scan response from the first slave device 231 is received (Step S526); and stopping the scanning of the second slave device 232 after the second slave device 232 receives the scan response from the first slave device 231. Details of the Steps S523 to S528 can be referred to FIG. 4 and the corresponding descriptions, and thus are not repeated herein.

Similarly, when the second slave device 232 does not receive the advertising from the first slave device 231, the second slave device 232 continuously performs the scanning for a predetermined scanning interval, e.g., FIG. 5 showing that the predetermined scanning interval is 30 seconds, but not limited to. When the scanning of the second slave device 232 reaches the predetermined scanning interval, the scanning is sopped, meaning the first slave device 231 currently not within the connection range or being turned off.

Step S528: When the second slave device 232 receives the scan response from the first slave device 231, the second slave device 232 breaks the Bluetooth connection with the first master device 211 and then Bluetooth connects to the second master device 212 according to the data of the scan response, wherein the second slave device 232 and the second master device 212 performs the connection and communication using standard Bluetooth protocol, and thus details thereof are not described herein.

In FIG. 5, the Steps S513 to S518 operate corresponding to the Steps S523 to S528 according to the timing in FIGS. 6 to FIG. 7B, and the above advertising, scan request and scan response are preferably sent within time intervals $T_A$ and $T_S$ in the figures.

It is appreciated that the above three embodiments are only intended to illustrate but not to limit the present disclosure. As long as the connection changing between multiple slave devices with the master device is triggered by the communication between slave devices without the intervening of a master device, it is not depart from the spirit and scope of the present disclosure.

The connection synchronizing method of a Bluetooth system 200 mentioned above includes the synchronizing method of the respective Bluetooth slave device such as the first slave device 231 and the second slave device 232.

As mentioned above, in the conventional Bluetooth system, the host side is used to inform the slave side when the connection synchronization between different slave devices is required or triggered. Accordingly, the present disclosure further provides a Bluetooth system/slave device and a connection synchronizing method thereof (e.g. FIG. 3-5) that utilize the communication between slave devices, i.e. informing slave devices still not changing the connected master device by a slave device that has changed the connected master device, to realize self-synchronization such that the Bluetooth connection synchronization of multiple slave devices is not intervened by the host side.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An operation method of a first slave device of a Bluetooth system, the first slave device being Bluetooth paired to multiple master devices, the operation method comprising:
   advertising a packet containing a device address of the first slave device when a master device connected with the first slave device is changed to a new master device, which is currently connected with the first slave device;
   identifying whether a scan request from a second slave device is received after the packet is advertised by the first slave device; and
   replying with a scan response to the second slave device when the first slave device receives the scan request to inform the second slave device to connect to the new master device currently connected with the first slave device.

2. The operation method as claimed in claim 1, further comprising:
   continuously advertising for a predetermined advertising interval when the first slave device does not receive any scan request.

3. The operation method as claimed in claim 1, wherein after the first slave device replies with the scan response to the second slave device, the operation method further comprises:
   stopping the advertising of the first slave device.

4. The operation method as claimed in claim 1, further comprising:
   scanning for the second slave device when the first slave device does not connect to any master device;
   identifying whether an advertising from the second slave device is received;
   replying with a scan request to the second slave device when the first slave device receives the advertising from the second slave device;
   identifying whether a scan response from the second slave device is received; and
   connecting the first slave device to a master device currently connected with the second slave device after the first slave device receives the scan response from the second slave device.

5. The operation method as claimed in claim 4, further comprising:
   continuously scanning for the second slave device for a predetermined scanning interval when the first slave device does not receive the advertising from the second slave device.

6. The operation method as claimed in claim 4, wherein after the first slave device receives the scan response from the second slave device, the operation method further comprises:
   stopping the scanning of the first slave device.

7. The operation method as claimed in claim 4, wherein a scanning interval during which the first slave device scans for the second slave device starts from a start point of Bluetooth time slots or after a predetermined time interval from the start point.

8. The operation method as claimed in claim 1, wherein the scan request of the second slave device comprises a device address of the second slave device; and
   the scan response replied from the first slave device comprises pairing information of the new master device, a pairing index, predetermined arrangement parameters required in synchronizing slave devices and a connection state of the first slave device.

9. An operation method of a Bluetooth slave device, comprising:
   scanning and identifying, by the Bluetooth slave device, whether an advertising, sent when a master device connected with a first slave device is changed to a new master device which is currently connected with the first slave device, is received from the first slave device;
   replying with a scan request to the first slave device when the Bluetooth slave device receives the advertising from the first slave device;
   identifying, by the Bluetooth slave device, whether a scan response from the first slave device is received; and
   connecting the Bluetooth slave device to the new master device currently connected with the first slave device after the Bluetooth slave device receives the scan response from the first slave device.

10. The operation method as claimed in claim 9, further comprising:
    continuously scanning for the first slave device for a predetermined scanning interval when the Bluetooth slave device does not receive the advertising from the first slave device.

11. The operation method as claimed in claim 9, further comprising:
    identifying whether the Bluetooth slave device is connected to the new master device; and
    identifying, using the Bluetooth slave device, whether the first slave device and the Bluetooth slave device are connected to the same current master device after the Bluetooth slave device receives the scan response from the first slave device and the Bluetooth slave device is connected to the new master device.

12. The operation method as claimed in claim 11, wherein a scanning interval during which the Bluetooth slave device scans for the first slave device starts from a start point of Bluetooth time slots or after a predetermined time interval from the start point when the Bluetooth slave device is not connected to the new master device.

13. The operation method as claimed in claim 9, wherein
the scan request replied from the Bluetooth slave device comprises a device address of the Bluetooth slave device; and
the scan response from the first slave device comprises pairing information of the new master device, a pairing index, predetermined arrangement parameters required in synchronizing slave devices and a connection state of the first slave device.

14. The operation method as claimed in claim 9, wherein after the Bluetooth slave device receives the scan response from the first slave device, the operation method further comprises:
stopping the scanning of the Bluetooth slave device.

15. An operation method of a first slave device of a Bluetooth system, the first slave device being Bluetooth paired to a first master device and a second master device, the operation method comprising:
disconnecting the first slave device from the first master device already Bluetooth connected with the first slave device;
searching for connection information of the second master device stored therein;
advertising a packet containing a device address of the first slave device after the connection information of the second master device is found in the first slave device;
identifying whether a scan request from a second slave device is received;
replying with a scan response to the second slave device when the first slave device receives the scan request from the second slave device;
Bluetooth connecting the first slave device to the second master device;
continuously advertising for a predetermined advertising interval when the first slave device does not receive any scan request.

16. The operation method as claimed in claim 15, wherein after the first slave device replies with the scan response to the second slave device, the operation method further comprises:
stopping the advertising of the first slave device.

17. The operation method as claimed in claim 15, wherein the disconnecting is performed when the first slave device is powered on, is waked up, or receives a switching signal.

18. The operation method as claimed in claim 17, wherein the switching signal is generated according to a signal of pressing a key of the first slave device, rotating a knob of the first slave device, touching a touch panel of the first slave device or knocking the first slave device.

19. The operation method as claimed in claim 17, wherein the switching signal is a response packet from the second master device.

* * * * *